(12) United States Patent
Cazzaniga

(10) Patent No.: US 7,008,187 B2
(45) Date of Patent: Mar. 7, 2006

(54) ROTOR FOR COOLING PUMPS, IN PARTICULAR FOR MARINE ENGINES AND RELEVANT MANUFACTURING PROCESS

(75) Inventor: Mario Cazzaniga, Sesto Calende (IT)

(73) Assignee: Manifattura Gomma Finnord S.p.A., Varese (IT)

( * ) Notice: Subject to any disclaimer, the term of this patent is extended or adjusted under 35 U.S.C. 154(b) by 0 days.

(21) Appl. No.: 10/766,595

(22) Filed: Jan. 27, 2004

(65) Prior Publication Data

US 2004/0191070 A1    Sep. 30, 2004

(30) Foreign Application Priority Data

Feb. 13, 2003  (IT) .......................... MI2003A0263

(51) Int. Cl.
*B64C 11/12*   (2006.01)
(52) U.S. Cl. ............................. 416/132 R; 416/134 R; 416/135; 416/230; 416/240; 416/241 A; 264/271.1
(58) Field of Classification Search ............ 416/229 R, 416/240, 241 A, 230, 134 R, 135, 132 R; 440/88 C, 88 P; 264/255, 271.1, 279
See application file for complete search history.

(56) References Cited

U.S. PATENT DOCUMENTS

| | | | |
|---|---|---|---|
| 2,776,254 A * | 1/1957 | Siegfried | 205/164 |
| 2,898,646 A * | 6/1959 | Doble | 403/383 |
| 3,053,190 A | 9/1962 | Carlson | |
| 3,307,634 A * | 3/1967 | Bihlmire | 416/135 |
| 4,178,837 A | 12/1979 | Frankenberg | |
| 4,512,720 A * | 4/1985 | Cholakis | 416/241 A |
| 4,592,733 A * | 6/1986 | Bland | 440/88 R |
| 4,718,837 A * | 1/1988 | Frazzell | 418/154 |
| 4,994,222 A * | 2/1991 | Iizumi et al. | 264/135 |
| 5,145,320 A * | 9/1992 | Blake et al. | 416/230 |
| 5,165,881 A * | 11/1992 | Wicen | 418/152 |
| 6,116,855 A * | 9/2000 | Maki | 416/146 R |

FOREIGN PATENT DOCUMENTS

EP    0103720    3/1984
EP    0349120    1/1990

* cited by examiner

*Primary Examiner*—Edward K. Look
*Assistant Examiner*—Devin Hanan
(74) *Attorney, Agent, or Firm*—Notaro & Michalos P.C.

(57) ABSTRACT

A rotor for cooling pumps is provided. The rotor is of the type which includes a core to be assembled on a shaft connected with an engine and a body, fitted in the core, provided with a plurality of radial tabs in flexible material. The core and the body with the tabs are both of a material like rubber, but with different hardness. In particular the core is made of a mixture of neoprene, nitrile, PVC and aramidic fiber. The rotor combines the features of lightness and wearproof of the rotors with a nylon core, but it is as strong and resistant as rotors with a metallic core.

7 Claims, 1 Drawing Sheet

ROTOR FOR COOLING PUMPS, IN PARTICULAR FOR MARINE ENGINES AND RELEVANT MANUFACTURING PROCESS

BACKGROUND OF THE INVENTION

This invention proposes a rotor for cooling pumps, in particular for marine engine pumps and the relevant manufacturing process.

More particularly the rotor according to the invention, which comprises a core to be keyed on a shaft connected with engine means and a plurality of radial tabs in a flexible material, is characterized in that said core and said tabs are both made of rubber or a similar material having different hardness.

More specifically the core is made of ebonized rubber, in particular a mixture of neoprene, nitrile, PVC and Kevlar®.

It is obtained a rotor which combines the features of the toughness distinguishing the rotors with a metallic core with those of lightness and wearproof distinguishing the rotors in synthetic material.

The invention fits into the sector of the cooling pumps of the type used on marine engines.

Generally these pumps comprise a rotor provided with a plurality of radial tabs, of flexible material, eccentrically assembled inside a chamber and put in rotation around its own axis.

The rotors of this type, known at present, are substantially divided into two typologies: those with a metallic core and those with a core in synthetic material.

In the rotors with metallic core the outer portion of the rotor body and its tabs are of flexible material, generally neoprene, injected on a core customarily made of brass, consisting of a substantially annular body having a scot for mounting it on a shaft connected with engine means.

With this type of rotor inconveniences often take place due to the corrosion and wear to which the metal is subject, when it comes in contact with the salty water and other polluting substances.

To avoid this inconvenience, rotors have been developed wherein the core consists of a cage of synthetic material, in particular nylon, charged with glass fiber, a core on which the outer portion in neoprene is then injected.

This second solution shows however the inconvenience of a remarkable brittleness with the consequent ease of breakage of the said rotor.

In the sector it is felt the need of a rotor which combines the features of lightness and wearproof of the rotors provided with a nylon core, but which results as strong and resistant as the rotors provided with a metallic core.

SUMMARY OF THE INVENTION

This problem is now solved by this invention, which proposes a rotor and the relevant manufacturing method, wherein both the core and the tabs are of rubber, but with different hardness, in particular with the core in ebonized and bakelized rubber, consisting of a mixture of neoprene, nitrile, PVC and aramidic fiber such as the Kevlar®.

DETAILED DESCRIPTION OF THE PREFERRED EMBODIMENT

This invention will be now described in detail, by way of a not limitative example, with reference to the enclosed figures; in which.

Figure 2:
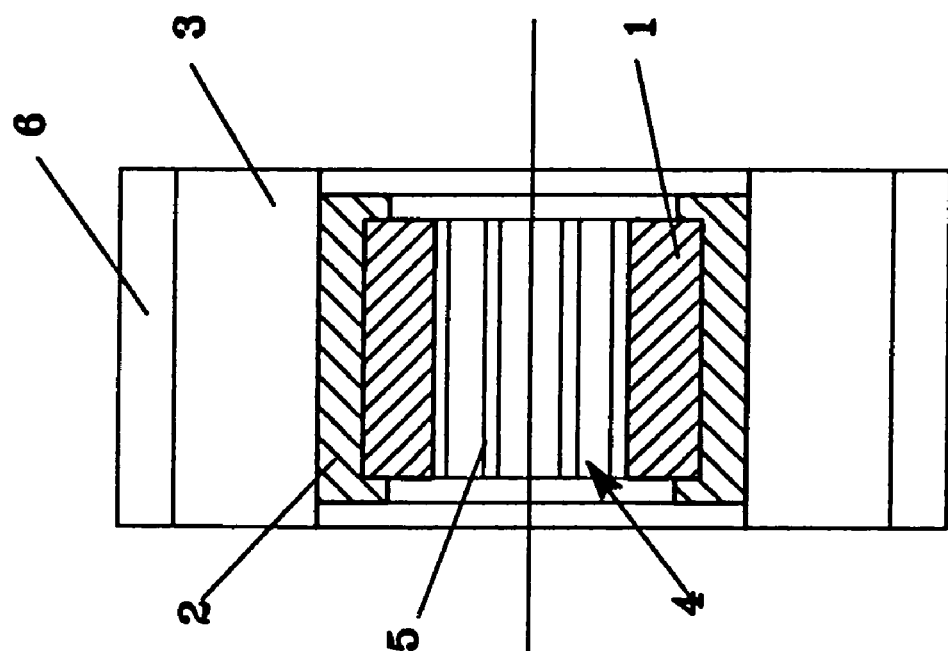
FIG. 2 is the section along the line A—A of FIG. 1.
Figure 1:
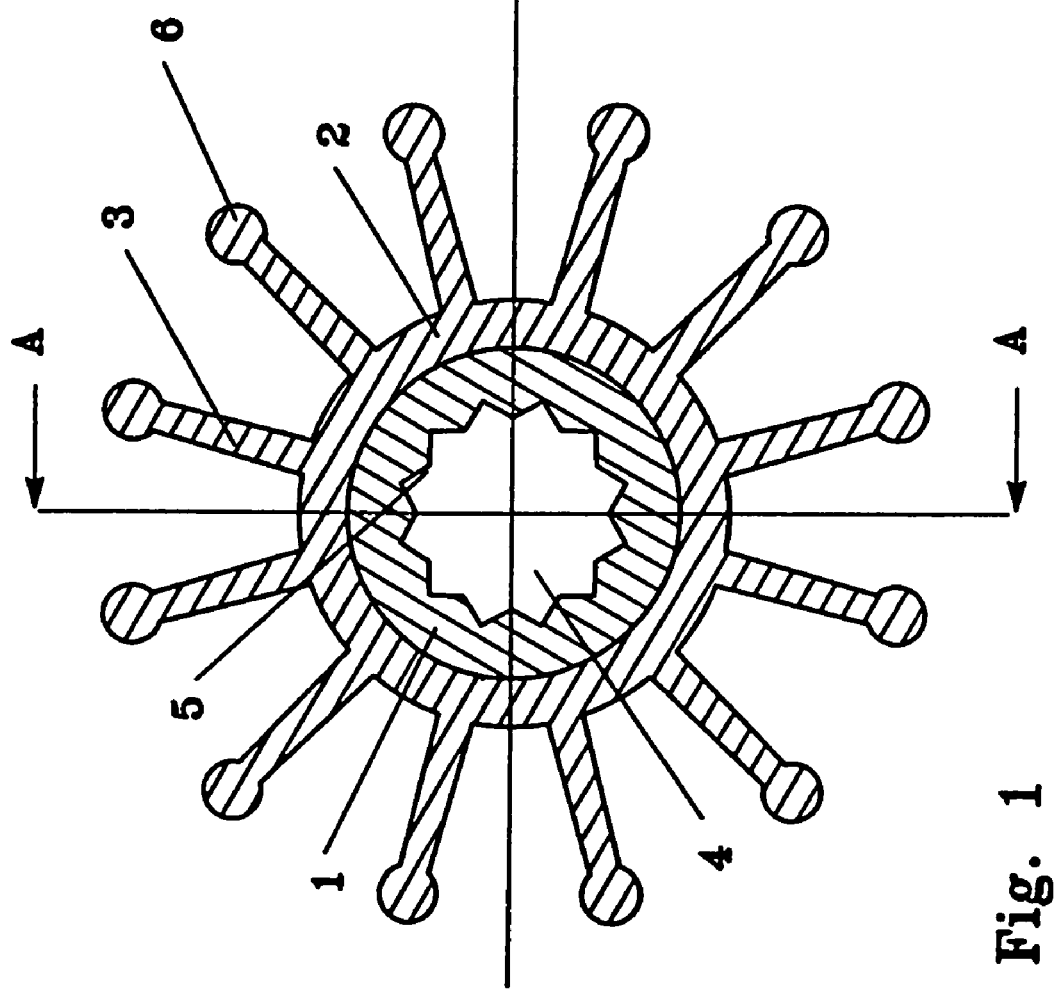
FIG. 1 shows the section of a rotor according to the invention along a plane perpendicular to the axis of the rotor.

With reference to the enclosed figures, the rotor according to the invention essentially comprises a core 1 onto which a body 2 is fitted in, provided with a plurality of tabs 3 of flexible material.

The core 1, which is addressed to be assembled on a shaft connected with engine means, shows a through hole 4 provided internally with a toothing 5 or another known system able to constrain under rotation the core and the shaft onto which the core is assembled.

The body 2 is preferably injected directly on the core and the tabs 3 show preferably the ends 6 which are addressed to flow in contact with the pump chamber walls, swollen for example with a substantially cylindrical outline.

A feature of this invention consists in that the core 1 and the body 2 with the tabs 3 are both made of rubber, but with different hardness.

Many tests carried out by the applicant in search of a material which combined the toughness distinguishing the metallic cores with the features of lightness and wearproof distinguishing the synthetic materials, allowed to notice that an optimum material for this purpose consists of a mixture comprising at least neoprene, nitrile, PVC and aramidic fiber.

These materials preferably enter into the mixtures in the following proportions, where the different components are expressed in weight:

| | |
|---|---|
| Polychloroprene | 30% to 50% |
| Acrylonitrile + PVC | 50% to 80% |
| Aramidic Fiber | 30% to 50% |
| Silica | 30% to 50% |
| Resin | 30% to 50% |
| Zinc oxide | 30% to 50% |
| Sulphur | 30% to 50% |

It must be observed that the sum of the minimum indicated percentages is higher than 100%, because in the field of the rubber it is usual to distinguish between the rubber components (in this case polychloroprene and acrylonitrile+PVC) and the other components, and to indicate the amount of these other components referred to 100 parts of rubber instead of the total amount.

More preferably, the materials enter in the mixture in the proportions indicated hereunder, where all the percentages are referred to the total amount.

| | |
|---|---|
| Polychloroprene | 25% |
| Acrylonitrile + PVC | 25% |
| Aramidic Fiber | 3% |
| Silica | 13.4% |
| Resin | 23% |
| Zinc oxide | 3.5% |
| Sulphur | 7.1% |

The body 2 with the tabs 3 can on the contrary be made integrally of neoprene (CR) or other polymers, as the case may be.

The manufacture takes place in the following way.

The material addressed to realize the core is first injected inside a mould, wherein a punch is inserted having the same form of the shaft onto which the rotor has to be assembled.

Once the material is consolidated, the core is extracted, cooled, dressed with an adhering chemical agent and afterwards inserted into the mould of the rotor, always by mounting it on a support having the same sizes of the pump shaft.

Then the neoprene is injected and forms the body with the tabs.

When the vulcanisation is ended, the rotor can be extracted from the mould and after a stabilisation period it can be assembled on the pump.

The rotor thus obtained, in addition to combine, as already told, the advantageous features of the rotors with a metallic core and those in synthetic material, does not require a particular process of finishing and results therefore to be of a more moderate cost.

A skilled in the art can then provide for different changes and variations, which have anyway to be everyone comprised within this invention.

What is claimed is:

1. Rotor for cooling pumps comprising a core to be assembled on a shaft connected with engine means and a body, fitted on the said core, provided with a plurality of radial tabs of flexible material, characterized in that said core and said body with said tabs are both of a rubber-like material, but with different hardness, wherein said core is made of a mixture of polychloroprene, nitrile, polyvinyl chloride, and aramidic fiber.

2. Rotor according to claim 1, characterized in that said aramidic fiber is poly-para-phenylene terephthalamide.

3. Rotor according to claim 1, characterized in that said core is made of a mixture comprising:

| | |
|---|---|
| Polychloroprene | 30% to 50% |
| Acrylonitrile + polyvinyl chloride | 50% to 80% |
| Aramidic Fiber | 30% to 50% |
| Silica | 30% to 50% |
| Resin | 30% to 50% |
| Zinc oxide | 30% to 50% |
| Sulphur | 30% to 50% | the said percentages being expressed in weight.

4. Rotor according to claim 1, characterized in that said core is made of a mixture comprising:

| | |
|---|---|
| Polychloroprene | 25% |
| Acrylonitrile + polyvinyl chloride | 25% |
| Aramidic Fiber | 3% |
| Silica | 13.4% |
| Resin | 23% |
| Zinc oxide | 3.5% |
| Sulphur | 7.1% | the said percentages being expressed in weight.

5. Process for the manufacture of rotors for cooling pumps according to claim 4, characterized in that the following phases are provided for:
    injection of the material addressed to realize the core inside a mould, into which a punch is inserted having the same form of the shaft onto which the rotor has to be assembled;
    once the consolidation has taken place, the core is extracted, cooled and then inserted into a second mould, always mounting it on a support having the same sizes of the pump shaft;
    injection of the material which forms the body with the tabs.

6. Process for the manufacture of rotors for cooling pumps according to claim 4, characterized in that it provides, after the core extraction from the first mould and before the following introduction of the core into the second mould, for a dressing phase with an adhering chemical agent.

7. Process for the manufacture of rotors for cooling pumps according to claim 5, characterized in that said core and said body with said tabs are both of a material like the rubber, but with different hardness.

* * * * *